United States Patent [19]
Michenfelder et al.

[11] Patent Number: 6,163,096
[45] Date of Patent: Dec. 19, 2000

[54] ELECTRICAL DRIVE UNIT

[75] Inventors: Gerhard Michenfelder, Lichtenau; Detlef Lauk, Renchen; Ernst Fischer, Gernsbach; Hansjoerg Karcher, Buehlertal; Juergen Herp, Buehl; Richard Hurst, Offenburg, all of Germany

[73] Assignee: Robert Bosch GmbH, Stuttgart, Germany

[21] Appl. No.: 09/254,072

[22] PCT Filed: Jun. 5, 1998

[86] PCT No.: PCT/DE98/01532

§ 371 Date: Feb. 26, 1999

§ 102(e) Date: Feb. 26, 1999

[87] PCT Pub. No.: WO99/00885

PCT Pub. Date: Jan. 7, 1999

[30] Foreign Application Priority Data

Jun. 26, 1997 [DE] Germany ................ 197 27 118

[51] Int. Cl.[7] ............ H01R 39/38; H02K 15/00
[52] U.S. Cl. ............ 310/239; 310/242; 310/42
[58] Field of Search .................. 310/75 R, 42, 310/229, 230, 238, 239, 240, 241, 242, 245, 247; 29/826, 596

[56] References Cited

U.S. PATENT DOCUMENTS

| 4,398,135 | 8/1983 | Busch et al. | 318/443 |
| 4,585,968 | 4/1986 | Cambrodon | 310/239 |
| 5,485,049 | 1/1996 | Shannon et al. | 310/248 |
| 5,493,220 | 6/1986 | Cousins et al. | 310/239 |
| 5,594,290 | 1/1997 | Shannon et al. | 310/251 |
| 5,656,878 | 8/1997 | Nakata | 310/71 |

Primary Examiner—Nestor Ramirez
Assistant Examiner—Dang Dinh Le
Attorney, Agent, or Firm—Ronald E. Greigg; Edwin E. Greigg

[57] ABSTRACT

An electrical drive unit for windshield wipers of a motor vehicle, including a drive motor which has an armature accommodated in a substantially cup-shaped housing, and a substantially cup-shaped gearbox for receiving gear elements which is secured on a face end to the housing and is closable by a gearbox cover. A closable opening is provided in the gearbox or housing, through which opening a brush holder support that holds commutator brushes can be pushed in a radial direction onto the commutator of the drive motor.

12 Claims, 4 Drawing Sheets

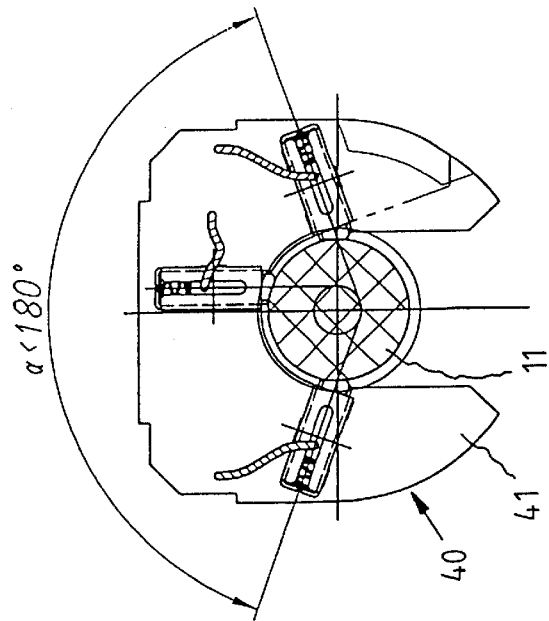
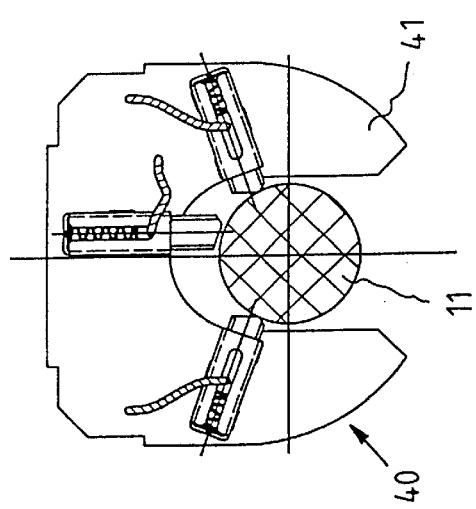
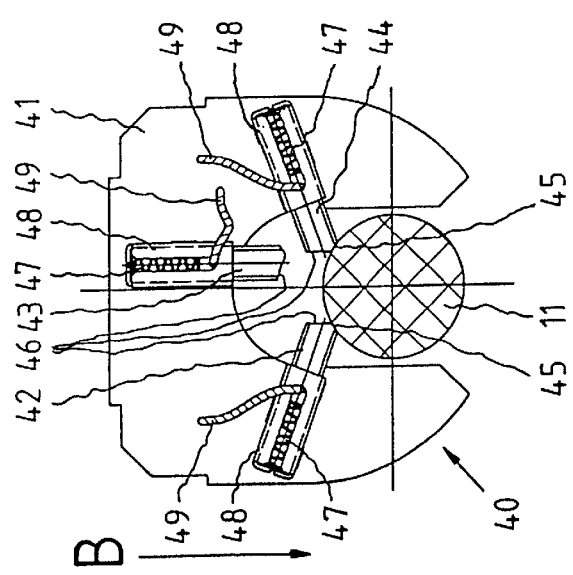

ELECTRICAL DRIVE UNIT

PRIOR ART

The invention relates to an electrical drive unit, in particular for windshield wipers of a motor vehicle, including a drive motor which has an armature accommodated in a substantially cup-shaped pole housing, and a substantially cup-shaped gearbox for receiving gear elements which is secured on its face end to the motor housing and is closable by a gearbox cover.

Such electric switch elements are known for instance from German Patent Disclosures DE 32 20 191 A1 and DE 32 35 622 A1, German Patent DE 39 30 144 C2, and German Patent Disclosure DE 41 16 100 A1.

A problematic aspect of these drive units is the relatively complicated and hence expensive assembly of many separate individual parts. In particular, assembling the various prefabricated component units or individual parts requires a great many joining directions. Mounting the brushes contacting the commutator proves to be especially problematic. In the known devices, these brushes are secured to annular brush holder supports that surround the motor shaft. Since the brushes must rest on the commutator with a certain contact pressure, it is necessary in mounting the brushes to push them outward somewhat in the radial direction and to keep them in that position, so that the motor shaft together with the commutator can be introduced into the opening, with the brushes pushed back. Not only does this complicated mode of assembly require some skill; it is also a hindrance, especially to assembling the electrical drive unit by machine.

It is therefore the object of the invention to refine an electrical drive unit of the generic type defined above in such a way that it has the simplest possible design, thus enabling the simplest possible assembly of the fewest possible parts or prefabricated component units.

ADVANTAGES OF THE INVENTION

According to the invention, this object is attained, in an electrical drive unit of the type defined at the outset, in that a closable opening is provided in the gearbox or pole housing, through which opening a brush holder support that holds commutator brushes can be pushed in the radial direction onto the commutator.

The opening in the pole housing or gearbox, through which a brush holder support that holds commutator brushes can be pushed radially onto the commutator, has the especially great advantage that inconveniently introducing the commutator into the bushes, disposed on a ring and held in a retracted position, as described above, can be dispensed with entirely. Instead, by means of the brush holder support, all the brushes can be pushed radially onto the commutator simultaneously, thus enabling lateral mounting of the commutator brushes, and in particular together with the lateral mounting of the gear elements. Moreover, securing the commutator brushes in this way also enables easy dismantling, for instance if the commutator brushes are worn. It is also especially advantageous that to mount the complete drive unit, only two joining directions are needed, namely one in the axial direction of the motor shaft and one perpendicular to the axial direction of the motor shaft.

Purely in principle, the opening may be disposed either in the gearbox or in the pole housing or even between the two. For instance, it may be provided in the pole housing and can be closable by a separate cover.

For the sake of very simple mounting, however, it is especially advantageous that the opening is disposed in the gearbox and is closable together with it by the gearbox cover.

To enable rpm-dependent triggering of the drive motor, in particular, it is provided in an advantageous embodiment that a ring magnet secured to a motor shaft is disposed in the opening, and its rotary position is detected by magnet sensors that are disposed on circuits secured to the inside of the gearbox cover. Because of this disposition, the magnet sensors can be mounted in a simple way and aligned precisely on tie ring magnets, thus making exact yet simple detection of the rotary position of the shaft of the drive motor possible.

Especially with a view to very simple mounting of the electric switch elements, it is provided in an advantageous embodiment that electric switch elements which are electrically conductively connected to one another by means of a pressed screen with welded connections or by means of a printed circuit board with soldered connections and can be mounted together with the gearbox cover are secured to the inside of the gearbox cover.

In this way, all the electric switch elements can be mounted beforehand on the inside of the gearbox cover, and the electrical contacts with the drive motor can then be made by mounting the gearbox cover.

Preferably, the electric switch elements also include interference suppression elements, such as interference suppression coils, interference suppression capacitors, and other interference suppression components, such as diodes, transistors, or the like, which in the mounted state of the gearbox cover are accommodated in packets especially provided for them in the gearbox.

As to the embodiment of the brush holder support, until now no detailed proposals have been made. An advantageous embodiment provides that the brush holder support has a substantially half-crescent-shaped holder plate, on which the brushes are disposed, angularly offset from one another, such that the two outermost brushes form an angle of less than 180°.

So that the brushes in the mounted state will always rest on the commutator, and to compensate for minor irregularities of the commutator and wear of the commutator brushes, it is advantageously provided that the brushes are disposed in guides so as to be displaceable counter to the restoring force of a spring. This resilient disposition of the brushes furthermore, and in a highly advantageous way, makes it possible simply to slip the brushes, disposed on the commutator, onto the brush holder support.

Especially to assure good contact of the brushes with the commutator, it is advantageously provided that the brushes, on their side toward the commutator, have a rounded contact-pressure face which is adapted to the commutator and which rests on the commutator in the mounted state of the brushes.

To enable simple mounting of the brushes by slipping on the brushes disposed on the brush holder support, it is provided in a highly advantageous embodiment that the brushes are beveled laterally in such a way that when they are slipped onto the commutator, the greatest possible resultant force, opposed to the restoring force of the spring, is engendered.

In this way, the brushes are especially well retracted into the joining directions counter to the restoring force of the spring. At the same time, the least possible force components perpendicular to this resultant force, components that cause friction, are engendered.

With a view to simply assembly, it can also be provided that the brush holder support can be secured to the gearbox cover and can be mounted together with it. In this way, not only can all the electric switch elements, including the interference suppression elements, but at the same time the brushes too can be mounted in a single step, together with the gearbox cover, as described above.

Furthermore, the brush holder support can also be mounted independently of the gearbox cover.

BRIEF DESCRIPTION OF THE DRAWINGS

Further characteristics and advantages of the invention are the subject of the ensuing description and of the drawing showing an exemplary embodiment.

In the drawing,

FIGS. 3a, 3b, 3c show various stages in the assembly of a brush holder support of a drive unit according to the invention.

DESCRIPTION OF THE EXEMPLARY EMBODIMENTS

Figure 1:
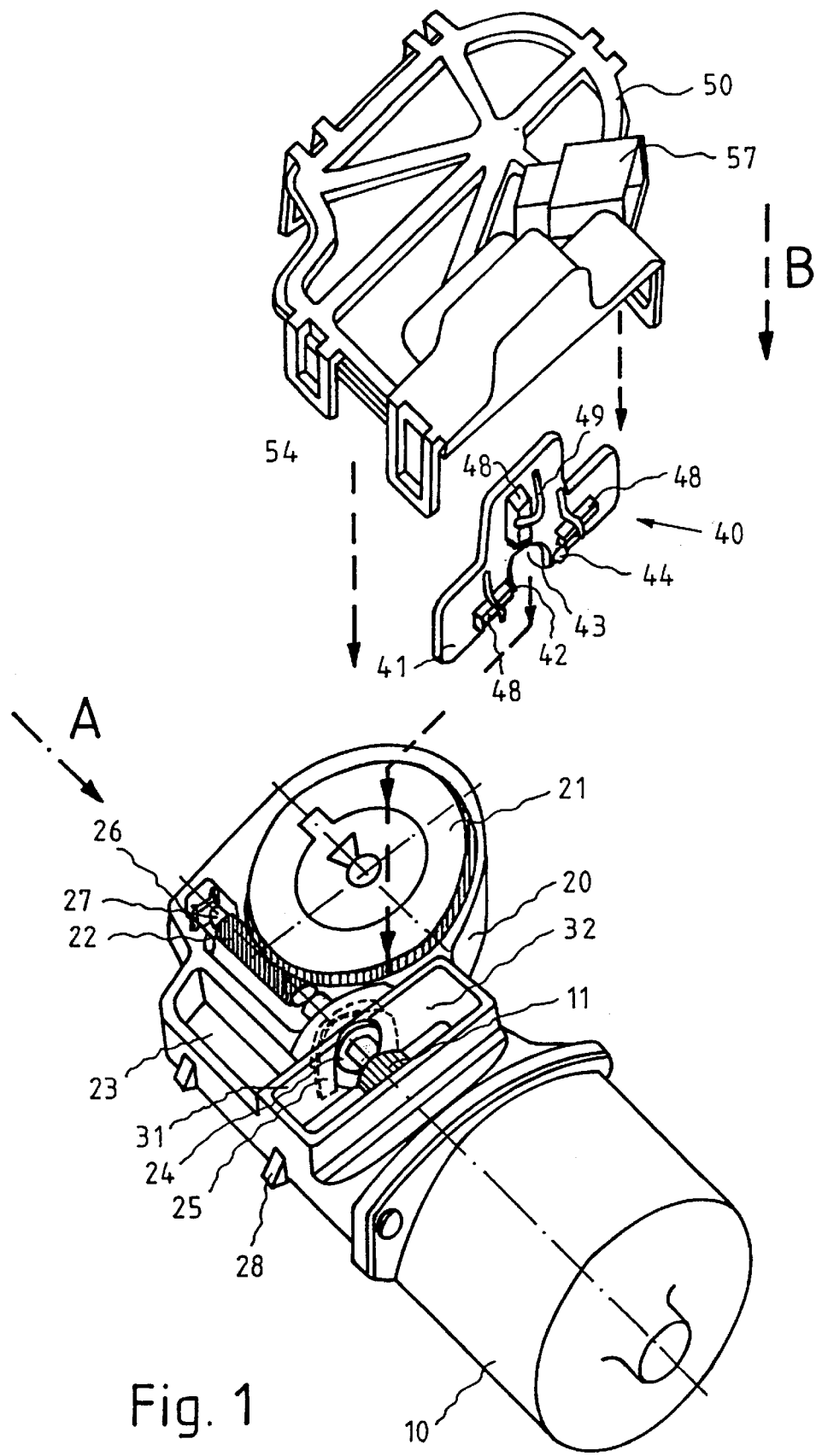
FIG. 1 is a schematic exploded view of a drive unit according to the invention.

An electrical drive unit for windshield wipers of a motor vehicle, shown in FIG. 1, includes a pole housing 10, in which permanent magnets and an armature winding, disposed rotatably on an armature shaft, and optionally a ring manget disposed on the armature shaft and other parts, known per se, of an electric motor (not shown) are accommodated.

A substantially cup-shaped gearbox 20 is secured to a flange on the face end of the pole housing 10. Gear elements, namely a gear wheel 21, which engages a worm 22 connected to the armature shaft of the drive motor, are disposed in the gearbox 20. The gearbox 20 has an opening 31, on its side toward the pole housing 10, through which the commutator 11 is disposed in freely accessible fashion. Also provided in the gearbox 20, adjacent to the worm 22, is a pocket 23, in which interference suppression elements 60, 61, which are secured to a gearbox cover 50 (see FIG. 2), are disposed in the mounted state of the gearbox cover 50.

As can also be seen from FIG. 1, a ball bearing 24, is provided for supporting the motor shaft, being located for instance, as shown, in a wall 32 disposed in the gearbox 20. The ball bearing 24 is secured in a manner known per se by securing clamps 25.

The motor shaft, provided with the worm 22, is prestressed on its side toward the worm 22 by a leaf spring 26, which presses against a so-called mushroom thrust button 27 and thereby enables both play-free axial bearing of the armature shaft and a defined prestress on the ball bearing 24.

A brush holder support, identified as a whole by reference numeral 40, can be pushed, together with the brushes 42, 43, 44 secured to it, through the opening 31 onto the commutator 11 in the radial direction; the brushes 42, 43, 44 retract radially in the process, counter to the restoring force of restoring springs 47 (FIG. 3), and are pressed in the inserted state against the outer face of the commutator 11.

Various stages in the assembly of such a brush holder support 40 are shown schematically in FIGS. 3a, 3b and 3c.

Figure 4B:
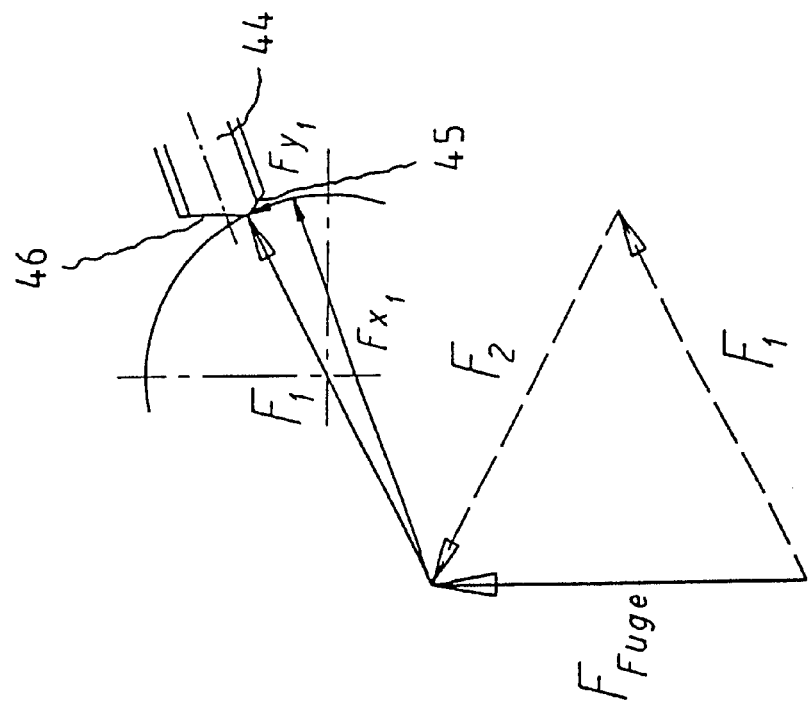
FIGS. 4a, 4b schematically show the force ratios for mounting the brush holder support, in the assembly steps shown in FIGS. 4a and 4b.
Figure 4A:
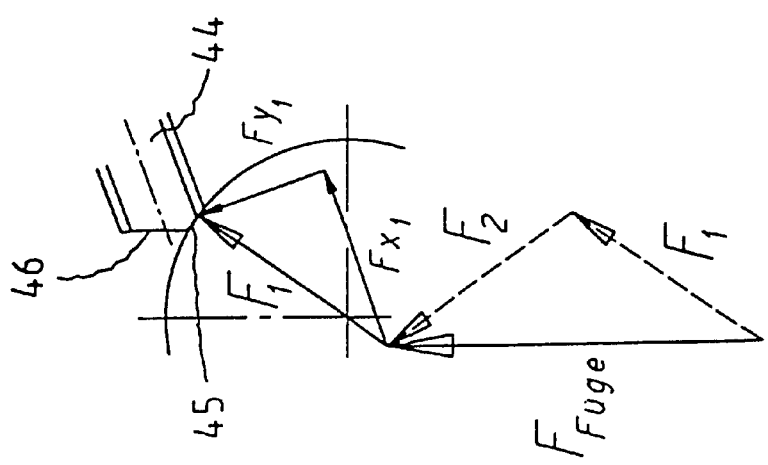

The force diagrams of the assembly stage shown in FIG. 3a are shown schematically in FIG. 4a, while the force ratios of the assembly stage shown in FIG. 3b are shown schematically in FIG. 4b.

As seen in FIG. 3, the commutator brushes 42, 43, 44 are disposed, angularly offset from one another, on a substantially half-crescent-shaped holder plate 41. The two outermost brushes 42, 44 form an angle that is less than 180°. The brushes 42, 43, 44 are resiliently supported in joining directions 48 counter to the restoring force of the restoring springs 47, so that when the brush holder support 40 is slipped onto the commutator 11, they are retracted in the joining directions 48 and are pressed, in the mounted state, against the commutator 11 by the spring force of the springs 47. On their underside, the brushes 42, 43, 44 have rounded contact-pressure faces 46, which are adapted to the commutator 11 and which in the mounted state rest on the commutator 11, surrounding it with positive engagement.

They are also beveled laterally in such a way that when they are slipped onto the commutator 11, the greatest possible resultant force F1, opposed to the restoring force of the spring 47, is engendered (see FIG. 4). The bevels 45 likewise have a cylindrical shape.

As shown in FIG. 3a, the brush holder support 40 is slipped onto the commutator 11 in the joining direction B in such a way that first the bevels 45 of the two outermost commutator brushes 42, 44 come to rest on the commutator 11. The force ratios that thus ensue are shown in FIG. 4a. The joining force FFüge is composed of two components, F1 and F2. F1 is the resultant force that acts on the commutator brush in its guide 48. It is composed in turn of two parts, Fx1 and Fy1; Fx1 is oriented parallel to the guidance direction, and Fy1 is oriented perpendicular to the guidance direction. Accordingly, Fx1 is the force engendered by a displacement of the commutator brushes 42, 44 in the guides 48, while conversely Fy1 engenders undesired frictional forces in the guides 48.

As the brush holder support 40 continues to be slipped on (see FIGS. 3b and 4b), the commutator brushes 42, 44, because of their bevels 45, are displaced in their guides 48 counter to the restoring force of the springs 47; in this case the predominant part of the resultant force F1 acts in the opposite direction from the restoring force of the restoring spring 47, while conversely the part Fy1 that engenders frictional forces is markedly less.

As the brush holder support 40 still continues to be slipped onto the commutator 11, finally both the commutator brush 43 disposed between the two outermost commutator brushes 42, 44 and the two outermost commutator brushes 42, 41 come to rest, with their contact-pressure face, on the commutator and are pressed against the commutator 11 by the restoring force of the spring 47.

It is especially advantageous that in this kind of mounting of the brush holder support 40, it is unnecessary to retract the brushes 42, 43, 44 and to restrain them in the retracted state.

As shown schematically in FIG. 1, the brush holder support 40 is preferably secured to the gearbox cover 50 and is connected electrically conductively to circuits (not shown) disposed on the inside of the gearbox cover 50 via brush leads 49 that are connected to the brushes 42, 43, 44.

Figure 2:
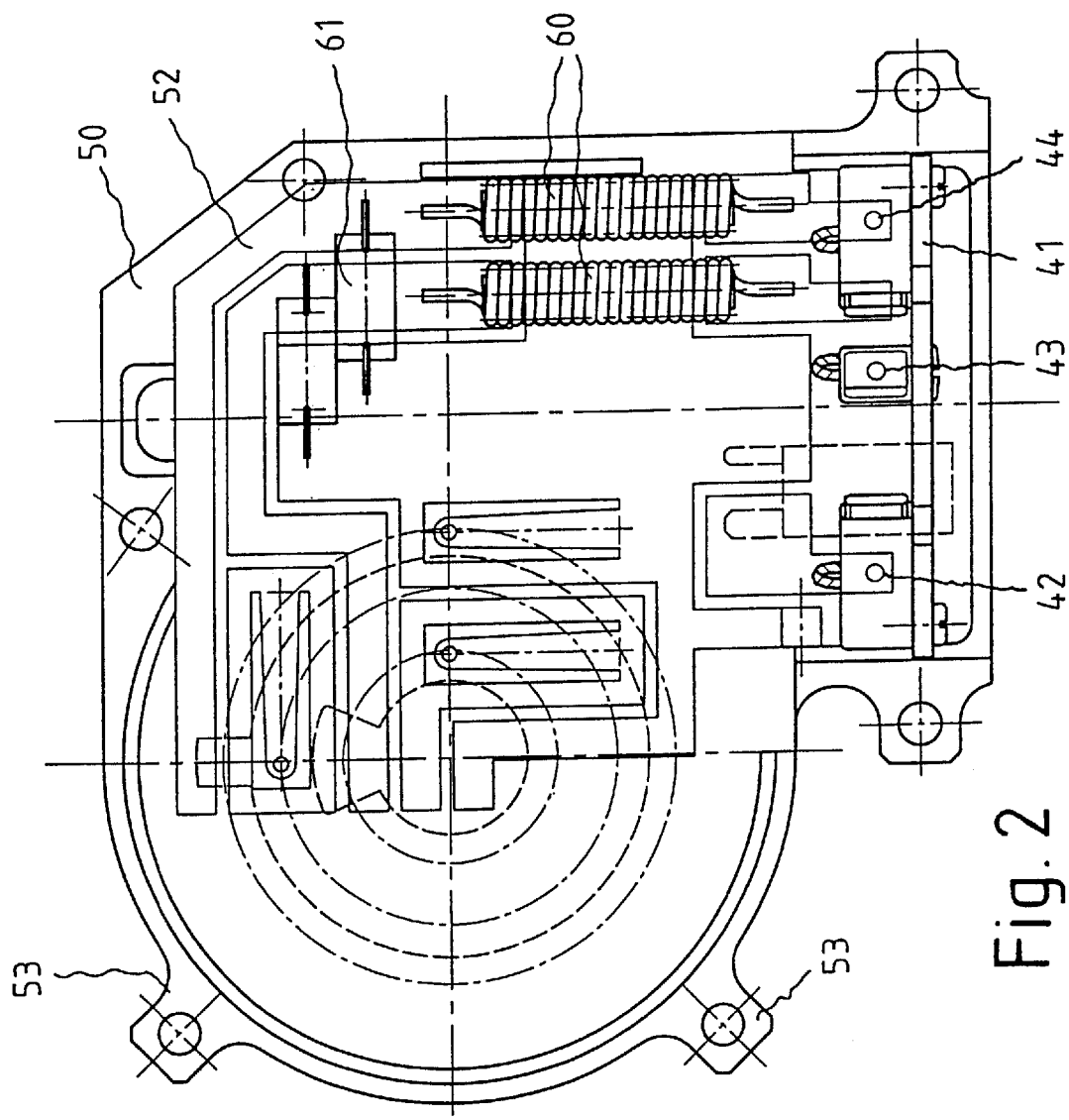
FIG. 2 is a plan view of a gearbox cover of the electrical drive unit of the invention shown in FIG. 1.

As seen particularly from FIG. 2, all the electrical connection elements, such as the interference suppression coils 60 and other interference suppression elements 51, which are connected to one another via a pressed screen 52 and to other circuit elements (not shown) by welded connections, are disposed on the inside of the gearbox cover 50.

Thus electronic circuits (not shown), for instance, that are used to trigger the drive motor can be provided on the inside of the gearbox cover 50. These circuits car in particular also cooperate with other electric switch elements, which are disposed on the armature shaft 11 on the side of the commutator 11 toward the worm 22. For instance, a ring magnet: (not shown), which cooperates with magnet sensors, such as Hall sensors, disposed on the inside of the gearbox cover 50 can be disposed on the armature shaft 11. These Hall sensors may for instance be part of an electronic circuit that detects the rotational position of the shaft of the drive motor. The gearbox cover 50 is secured for instance by snap hooks 54, which cooperate with detent elements 28 disposed on the gearbox, or by screw connections, as shown in FIG. 2, that are disposed on flanges 53, intended for the purpose, of the gearbox cover 40 and are correspondingly disposed on the gearbox 20. Receptacles 57 for male or female connection plugs can also be provided on the gearbox cover 50.

The assembly of the electrical drive unit shown in FIG. 1 and FIG. 2 is effected along the two joining directions, represented by arrows A and B, in the manner that will now be described. First, the armature is inserted into the pole housing 10; then the gearbox 20, with the opening 31 embodied in it, is secured by its face end to the pole housing 10 (joining direction A); next, the armature is secured axially with a retaining clip, and the longitudinal play of the armature is adjusted with a tension spring. The brush holder support 40, the gear wheel, and the gearbox cover 50 are mounted in the joining direction B.

Thus to assemble the electrical drive unit, only the two joining directions A and B are required. In particular, both the mounting of the brushes 42, 43, 44 on the commutator 11 and the mounting of the gear wheel 21 and the gearbox cover 50 can be done in the radial direction, so that introducing the commutator 11 into the brush holder support 40 inconveniently in the axial direction can be done away with entirely.

The foregoing relates to preferred exemplary embodiments of the invention, it being understood that other variants and embodiments thereof are possible within the spirit and scope of the invention, the latter being defined by the appended claims.

What is claimed is:

1. An electrical drive unit for windshield wipers of a motor vehicle, including a drive motor which has an armature accommodated in a substantially cup-shaped housing (10), and a substantially cup-shaped gearbox (20) for receiving gear elements (21, 26) which is secured on a face end to the motor housing (10) and is closable by a gearbox cover (50), a closable opening (31) is provided in the gearbox (20), a brush holder support (40) that holds commutator brushes (42, 43, 44) can be pushed in a radial direction through the opening (31) onto the commutator (11) of the drive motor, the opening (31) is closable by the gearbox cover (50) and the brush holder support (40) is secured to the gearbox cover (50) and is mounted together with the gearbox cover.

2. The drive unit according to claim 1, in which a ring magnet secured to a motor shaft is disposed in the opening (31), and a rotary position of the motor shaft is detected by magnet sensors that are disposed on circuits secured to an inside of the gearbox cover.

3. The drive unit according to claim 2, in which electric switch elements are secured to an inside of the gearbox cover (50) and are electrically conductively connected to one another by means of a pressed screen (52) or a printed circuit board and can be mounted together with the gearbox cover (50).

4. The drive unit according to claim 1, in which electric switch elements are secured to an inside of the gearbox cover (50) and are electrically conductively connected to one another by means of a pressed screen (52) or a printed circuit board and can be mounted together with the gearbox cover (50).

5. The drive unit according to claim 4, in which the electric switch elements include interference suppression elements (60, 61), which in the mounted state are accommodated in receptacle pockets (23), in the gearbox (20).

6. The drive unit according to claim 1, in which the brush holder support (40) has a substantially half-crescent-shaped holder plate (41), on which the brushes (42, 43, 44) are disposed, angularly offset from one another, such that two outermost substantially oppositely disposed brushes (42, 44) form an angle of less than 180°.

7. The drive unit according to claim 6, in which the brushes (42, 43, 44) are disposed in guides (48) so as to be displaceable counter to a restoring force of a spring (47).

8. The drive unit according to claim 7, in which the brushes (42, 43, 44), on an end toward the commutator (11), have a rounded contact-pressure face (46) that is adapted to the commutator (11).

9. An electrical drive unit for windshield wipers of a motor vehicle, including a drive motor which has an armature accommodated in a substantially cup-shaped housing (10), and a substantially cup-shaped gearbox (20) for receiving gear elements (21, 26) which is secured on a face end to the motor housing (10) and is closable by a gearbox cover (50), a closable opening (31) is provided in the gearbox (20) or housing (10), through which opening a brush holder support (40) that holds commutator brushes (42, 43, 44) can be pushed in a radial direction onto the commutator (11) of the drive motor, the brush holder support (40) has a substantially half-crescent-shaped holder plate (41), on which the brushes (42, 43, 44) are disposed, angularly offset from one another, such that two outermost substantially oppositely disposed brushes (42, 44) form an angle of less than 180°, and the brushes (42, 43, 44) are beveled laterally in such a way that when they are slipped onto the commutator (11), a greatest possible result force (F), which is opposed to the restoring force of the spring (47), is engendered.

10. The drive unit according to claim 9, in which the bevel (45) has a cylindrical shape.

11. The drive unit according to claim 9, in which the brushes (42, 43, 44) are disposed in guides (48) so as to be displaceable counter to a restoring force of a spring (47).

12. The drive unit according to claim 9, in which the brushes (42, 43, 44), on an end toward the commutator (11), have a rounded contact-pressure face (46) that is adapted to the commutator (11).

* * * * *